United States Patent
Tanaka et al.

(10) Patent No.: US 10,999,476 B2
(45) Date of Patent: May 4, 2021

(54) IMAGE FORMING APPARATUS CONFIGURED TO PERFORM GRADATION CORRECTION PROCESS

(71) Applicant: CANON KABUSHIKI KAISHA, Tokyo (JP)

(72) Inventors: Takayuki Tanaka, Tokyo (JP); Shinji Katagiri, Yokohama (JP); Shuichi Tetsuno, Kawasaki (JP); Ken Nakagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/844,793

(22) Filed: Apr. 9, 2020

(65) Prior Publication Data

US 2020/0358927 A1    Nov. 12, 2020

(30) Foreign Application Priority Data

May 8, 2019    (JP) .............................. JP2019-088576

(51) Int. Cl.
*H04N 1/58* (2006.01)
*H04N 1/60* (2006.01)
*H04N 1/00* (2006.01)

(52) U.S. Cl.
CPC .......... *H04N 1/58* (2013.01); *H04N 1/00015* (2013.01); *H04N 1/00023* (2013.01); *H04N 1/00037* (2013.01); *H04N 1/00045* (2013.01); *H04N 1/00068* (2013.01); *H04N 1/00082* (2013.01); *H04N 1/6027* (2013.01);
(Continued)

(58) Field of Classification Search
CPC .......... H04N 1/00015; H04N 1/00023; H04N 1/00031; H04N 1/00034; H04N 1/00045; H04N 1/00068; H04N 1/00082; H04N 1/00087; H04N 1/58; H04N 1/60;
(Continued)

(56) References Cited

U.S. PATENT DOCUMENTS

| | | | |
|---|---|---|---|
| 7,068,393 B2 | 6/2006 | Sasanuma et al. | ............ 358/1.9 |
| 7,097,270 B2 * | 8/2006 | Yamazaki | .......... G03G 15/5062 |
| | | | 347/19 |

(Continued)

FOREIGN PATENT DOCUMENTS

| | | | | |
|---|---|---|---|---|
| JP | 2002023445 A | * | 1/2002 | ............. H04N 1/506 |
| JP | 2002-305662 | | 10/2002 | |

(Continued)

*Primary Examiner* — Scott A Rogers
(74) *Attorney, Agent, or Firm* — Venable LLP

(57) ABSTRACT

An image forming apparatus includes a gradation correction unit configured to perform a correction process on first image data expressing first gradation values, and output second image data expressing second gradation values. The gradation correction unit is configured to determine the second gradation values based on the first gradation values of a plurality of colors of a plurality of pixels in an area including a process target pixel and having a size corresponding to a first color misregistration amount. The gradation correction unit is further configured to determine the second gradation values such that there is no pixel in which a sum of the second gradation values of the plurality of colors exceeds a first threshold value, even when color misregistration within the first color misregistration amount occurs.

26 Claims, 12 Drawing Sheets

(52) U.S. Cl.
CPC ......... *H04N 1/6033* (2013.01); *H04N 1/6041* (2013.01); *H04N 1/6055* (2013.01)

(58) Field of Classification Search
CPC .... H04N 1/603; H04N 1/6033; H04N 1/6041; H04N 1/6052; H04N 1/6055
See application file for complete search history.

(56) References Cited

U.S. PATENT DOCUMENTS

| | | | |
|---|---|---|---|
| 8,059,318 B2 | 11/2011 | Maebashi et al. | 358/504 |
| 2002/0054200 A1 | 5/2002 | Hayakawa | 347/116 |

FOREIGN PATENT DOCUMENTS

| | | | | |
|---|---|---|---|---|
| JP | 2008176289 A | * | 7/2008 | ............. B41J 2/525 |
| JP | 2009-135885 | | 6/2009 | |
| JP | 4659182 B | | 3/2011 | |
| JP | 5335221 B | | 11/2013 | |

\* cited by examiner

FIG. 6A

| Y=200<br>M=255<br>C=0<br>K=0 | Y=200<br>M=255<br>C=0<br>K=0 | Y=200<br>M=255<br>C=0<br>K=0 | Y=0<br>M=0<br>C=255<br>K=0 | Y=0<br>M=0<br>C=255<br>K=0 |
|---|---|---|---|---|
| Y=200<br>M=255<br>C=0<br>K=0 | Y=200<br>M=255<br>C=0<br>K=0 | Y=200<br>M=255<br>C=0<br>K=0 | Y=0<br>M=0<br>C=255<br>K=0 | Y=0<br>M=0<br>C=255<br>K=0 |
| Y=200<br>M=255<br>C=0<br>K=0 | Y=200<br>M=255<br>C=0<br>K=0 | Y=200<br>M=255<br>C=0<br>K=0 | Y=0<br>M=0<br>C=255<br>K=0 | Y=0<br>M=0<br>C=255<br>K=0 |
| Y=200<br>M=255<br>C=0<br>K=0 | Y=200<br>M=255<br>C=0<br>K=0 | Y=200<br>M=255<br>C=0<br>K=0 | Y=0<br>M=0<br>C=255<br>K=0 | Y=0<br>M=0<br>C=255<br>K=0 |
| Y=200<br>M=255<br>C=0<br>K=0 | Y=200<br>M=255<br>C=0<br>K=0 | Y=200<br>M=255<br>C=0<br>K=0 | Y=0<br>M=0<br>C=255<br>K=0 | Y=0<br>M=0<br>C=255<br>K=0 |

FIG. 6B

| Y=200<br>M=255<br>C=0<br>K=0 | Y=200<br>M=255<br>C=0<br>K=0 | Y=165<br>M=210<br>C=0<br>K=0 | Y=0<br>M=0<br>C=210<br>K=0 | Y=0<br>M=0<br>C=255<br>K=0 |
|---|---|---|---|---|
| Y=200<br>M=255<br>C=0<br>K=0 | Y=200<br>M=255<br>C=0<br>K=0 | Y=165<br>M=210<br>C=0<br>K=0 | Y=0<br>M=0<br>C=210<br>K=0 | Y=0<br>M=0<br>C=255<br>K=0 |
| Y=200<br>M=255<br>C=0<br>K=0 | Y=200<br>M=255<br>C=0<br>K=0 | Y=165<br>M=210<br>C=0<br>K=0 | Y=0<br>M=0<br>C=210<br>K=0 | Y=0<br>M=0<br>C=255<br>K=0 |
| Y=200<br>M=255<br>C=0<br>K=0 | Y=200<br>M=255<br>C=0<br>K=0 | Y=165<br>M=210<br>C=0<br>K=0 | Y=0<br>M=0<br>C=210<br>K=0 | Y=0<br>M=0<br>C=255<br>K=0 |
| Y=200<br>M=255<br>C=0<br>K=0 | Y=200<br>M=255<br>C=0<br>K=0 | Y=165<br>M=210<br>C=0<br>K=0 | Y=0<br>M=0<br>C=210<br>K=0 | Y=0<br>M=0<br>C=255<br>K=0 |

F I G. 7A

| Y=200 M=255 C=0 K=0 | Y=200 M=255 C=0 K=0 | Y=200 M=255 C=255 K=0 | Y=0 M=0 C=255 K=0 | Y=0 M=0 C=255 K=0 |
|---|---|---|---|---|
| Y=200 M=255 C=0 K=0 | Y=200 M=255 C=0 K=0 | Y=200 M=255 C=255 K=0 | Y=0 M=0 C=255 K=0 | Y=0 M=0 C=255 K=0 |
| Y=200 M=255 C=0 K=0 | Y=200 M=255 C=0 K=0 | Y=200 M=255 C=255 K=0 | Y=0 M=0 C=255 K=0 | Y=0 M=0 C=255 K=0 |
| Y=200 M=255 C=0 K=0 | Y=200 M=255 C=0 K=0 | Y=200 M=255 C=255 K=0 | Y=0 M=0 C=255 K=0 | Y=0 M=0 C=255 K=0 |
| Y=200 M=255 C=0 K=0 | Y=200 M=255 C=0 K=0 | Y=200 M=255 C=255 K=0 | Y=0 M=0 C=255 K=0 | Y=0 M=0 C=255 K=0 |

F I G. 7B

| Y=200 M=255 C=0 K=0 | Y=200 M=255 C=0 K=0 | Y=165 M=210 C=210 K=0 | Y=0 M=0 C=255 K=0 | Y=0 M=0 C=255 K=0 |
|---|---|---|---|---|
| Y=200 M=255 C=0 K=0 | Y=200 M=255 C=0 K=0 | Y=165 M=210 C=210 K=0 | Y=0 M=0 C=255 K=0 | Y=0 M=0 C=255 K=0 |
| Y=200 M=255 C=0 K=0 | Y=200 M=255 C=0 K=0 | Y=165 M=210 C=210 K=0 | Y=0 M=0 C=255 K=0 | Y=0 M=0 C=255 K=0 |
| Y=200 M=255 C=0 K=0 | Y=200 M=255 C=0 K=0 | Y=165 M=210 C=210 K=0 | Y=0 M=0 C=255 K=0 | Y=0 M=0 C=255 K=0 |
| Y=200 M=255 C=0 K=0 | Y=200 M=255 C=0 K=0 | Y=165 M=210 C=210 K=0 | Y=0 M=0 C=255 K=0 | Y=0 M=0 C=255 K=0 |

FIG. 9

| Y=200<br>M=255<br>C=0<br>K=0 | Y=200<br>M=255<br>C=0<br>K=0 | Y=165<br>M=210<br>C=64<br>K=0 | Y=50<br>M=0<br>C=210<br>K=0 | Y=0<br>M=0<br>C=255<br>K=0 |
|---|---|---|---|---|
| Y=200<br>M=255<br>C=0<br>K=0 | Y=200<br>M=255<br>C=0<br>K=0 | Y=165<br>M=210<br>C=64<br>K=0 | Y=50<br>M=0<br>C=210<br>K=0 | Y=0<br>M=0<br>C=255<br>K=0 |
| Y=200<br>M=255<br>C=0<br>K=0 | Y=200<br>M=255<br>C=0<br>K=0 | Y=165<br>M=210<br>C=64<br>K=0 | Y=50<br>M=0<br>C=210<br>K=0 | Y=0<br>M=0<br>C=255<br>K=0 |
| Y=200<br>M=255<br>C=0<br>K=0 | Y=200<br>M=255<br>C=0<br>K=0 | Y=165<br>M=210<br>C=64<br>K=0 | Y=50<br>M=0<br>C=210<br>K=0 | Y=0<br>M=0<br>C=255<br>K=0 |
| Y=200<br>M=255<br>C=0<br>K=0 | Y=200<br>M=255<br>C=0<br>K=0 | Y=165<br>M=210<br>C=64<br>K=0 | Y=50<br>M=0<br>C=210<br>K=0 | Y=0<br>M=0<br>C=255<br>K=0 |

F I G. 10A

| Y=200<br>M=255<br>C=0<br>K=0 | Y=200<br>M=255<br>C=64<br>K=0 | Y=165<br>M=210<br>C=210<br>K=0 | Y=50<br>M=0<br>C=255<br>K=0 | Y=0<br>M=0<br>C=255<br>K=0 |
|---|---|---|---|---|
| Y=200<br>M=255<br>C=0<br>K=0 | Y=200<br>M=255<br>C=64<br>K=0 | Y=165<br>M=210<br>C=210<br>K=0 | Y=50<br>M=0<br>C=255<br>K=0 | Y=0<br>M=0<br>C=255<br>K=0 |
| Y=200<br>M=255<br>C=0<br>K=0 | Y=200<br>M=255<br>C=64<br>K=0 | Y=165<br>M=210<br>C=210<br>K=0 | Y=50<br>M=0<br>C=255<br>K=0 | Y=0<br>M=0<br>C=255<br>K=0 |
| Y=200<br>M=255<br>C=0<br>K=0 | Y=200<br>M=255<br>C=64<br>K=0 | Y=165<br>M=210<br>C=210<br>K=0 | Y=50<br>M=0<br>C=255<br>K=0 | Y=0<br>M=0<br>C=255<br>K=0 |
| Y=200<br>M=255<br>C=0<br>K=0 | Y=200<br>M=255<br>C=64<br>K=0 | Y=165<br>M=210<br>C=210<br>K=0 | Y=50<br>M=0<br>C=255<br>K=0 | Y=0<br>M=0<br>C=255<br>K=0 |

F I G. 10B

| Y=200<br>M=255<br>C=0<br>K=0 | Y=200<br>M=255<br>C=0<br>K=0 | Y=165<br>M=210<br>C=0<br>K=0 | Y=50<br>M=0<br>C=64<br>K=0 | Y=0<br>M=0<br>C=210<br>K=0 |
|---|---|---|---|---|
| Y=200<br>M=255<br>C=0<br>K=0 | Y=200<br>M=255<br>C=0<br>K=0 | Y=165<br>M=210<br>C=0<br>K=0 | Y=50<br>M=0<br>C=64<br>K=0 | Y=0<br>M=0<br>C=210<br>K=0 |
| Y=200<br>M=255<br>C=0<br>K=0 | Y=200<br>M=255<br>C=0<br>K=0 | Y=165<br>M=210<br>C=0<br>K=0 | Y=50<br>M=0<br>C=64<br>K=0 | Y=0<br>M=0<br>C=210<br>K=0 |
| Y=200<br>M=255<br>C=0<br>K=0 | Y=200<br>M=255<br>C=0<br>K=0 | Y=165<br>M=210<br>C=0<br>K=0 | Y=50<br>M=0<br>C=64<br>K=0 | Y=0<br>M=0<br>C=210<br>K=0 |
| Y=200<br>M=255<br>C=0<br>K=0 | Y=200<br>M=255<br>C=0<br>K=0 | Y=165<br>M=210<br>C=0<br>K=0 | Y=50<br>M=0<br>C=64<br>K=0 | Y=0<br>M=0<br>C=210<br>K=0 |

F I G. 11

| Y=200<br>M=255<br>C=0<br>K=0 | Y=200<br>M=255<br>C=0<br>K=0 | Y=200<br>M=255<br>C=0<br>K=0 | C=0<br>M=0<br>Y=0<br>K=0 | Y=0<br>M=0<br>C=255<br>K=0 |
|---|---|---|---|---|
| Y=200<br>M=255<br>C=0<br>K=0 | Y=200<br>M=255<br>C=0<br>K=0 | Y=200<br>M=255<br>C=0<br>K=0 | C=0<br>M=0<br>Y=0<br>K=0 | Y=0<br>M=0<br>C=255<br>K=0 |
| Y=200<br>M=255<br>C=0<br>K=0 | Y=200<br>M=255<br>C=0<br>K=0 | Y=200<br>M=255<br>C=0<br>K=0 | C=0<br>M=0<br>Y=0<br>K=0 | Y=0<br>M=0<br>C=255<br>K=0 |
| Y=200<br>M=255<br>C=0<br>K=0 | Y=200<br>M=255<br>C=0<br>K=0 | Y=200<br>M=255<br>C=0<br>K=0 | C=0<br>M=0<br>Y=0<br>K=0 | Y=0<br>M=0<br>C=255<br>K=0 |
| Y=200<br>M=255<br>C=0<br>K=0 | Y=200<br>M=255<br>C=0<br>K=0 | Y=200<br>M=255<br>C=0<br>K=0 | C=0<br>M=0<br>Y=0<br>K=0 | Y=0<br>M=0<br>C=255<br>K=0 |

FIG. 12A

| Y=200<br>M=255<br>C=0<br>K=0 | Y=200<br>M=255<br>C=0<br>K=0 | Y=175<br>M=205<br>C=0<br>K=0 | Y=0<br>M=0<br>C=205<br>K=0 | Y=0<br>M=0<br>C=255<br>K=0 |
|---|---|---|---|---|
| Y=200<br>M=255<br>C=0<br>K=0 | Y=200<br>M=255<br>C=0<br>K=0 | Y=175<br>M=205<br>C=0<br>K=0 | Y=0<br>M=0<br>C=205<br>K=0 | Y=0<br>M=0<br>C=255<br>K=0 |
| Y=200<br>M=255<br>C=0<br>K=0 | Y=200<br>M=255<br>C=0<br>K=0 | Y=175<br>M=205<br>C=0<br>K=0 | Y=0<br>M=0<br>C=205<br>K=0 | Y=0<br>M=0<br>C=255<br>K=0 |
| Y=200<br>M=255<br>C=0<br>K=0 | Y=200<br>M=255<br>C=0<br>K=0 | Y=175<br>M=205<br>C=0<br>K=0 | Y=0<br>M=0<br>C=205<br>K=0 | Y=0<br>M=0<br>C=255<br>K=0 |
| Y=200<br>M=255<br>C=0<br>K=0 | Y=200<br>M=255<br>C=0<br>K=0 | Y=175<br>M=205<br>C=0<br>K=0 | Y=0<br>M=0<br>C=205<br>K=0 | Y=0<br>M=0<br>C=255<br>K=0 |

FIG. 12B

| Y=200<br>M=255<br>C=0<br>K=0 | Y=200<br>M=255<br>C=0<br>K=0 | Y=175<br>M=205<br>C=205<br>K=0 | Y=0<br>M=0<br>C=255<br>K=0 | Y=0<br>M=0<br>C=255<br>K=0 |
|---|---|---|---|---|
| Y=200<br>M=255<br>C=0<br>K=0 | Y=200<br>M=255<br>C=0<br>K=0 | Y=175<br>M=205<br>C=205<br>K=0 | Y=0<br>M=0<br>C=255<br>K=0 | Y=0<br>M=0<br>C=255<br>K=0 |
| Y=200<br>M=255<br>C=0<br>K=0 | Y=200<br>M=255<br>C=0<br>K=0 | Y=175<br>M=205<br>C=205<br>K=0 | Y=0<br>M=0<br>C=255<br>K=0 | Y=0<br>M=0<br>C=255<br>K=0 |
| Y=200<br>M=255<br>C=0<br>K=0 | Y=200<br>M=255<br>C=0<br>K=0 | Y=175<br>M=205<br>C=205<br>K=0 | Y=0<br>M=0<br>C=255<br>K=0 | Y=0<br>M=0<br>C=255<br>K=0 |
| Y=200<br>M=255<br>C=0<br>K=0 | Y=200<br>M=255<br>C=0<br>K=0 | Y=175<br>M=205<br>C=205<br>K=0 | Y=0<br>M=0<br>C=255<br>K=0 | Y=0<br>M=0<br>C=255<br>K=0 |

F I G. 13A

| Y=200<br>M=255<br>C=0<br>K=0 | Y=200<br>M=255<br>C=0<br>K=0 | Y=155<br>M=221<br>C=0<br>K=0 | Y=0<br>M=0<br>C=209<br>K=0 | Y=0<br>M=0<br>C=255<br>K=0 |
|---|---|---|---|---|
| Y=200<br>M=255<br>C=0<br>K=0 | Y=200<br>M=255<br>C=0<br>K=0 | Y=155<br>M=221<br>C=0<br>K=0 | Y=0<br>M=0<br>C=209<br>K=0 | Y=0<br>M=0<br>C=255<br>K=0 |
| Y=200<br>M=255<br>C=0<br>K=0 | Y=200<br>M=255<br>C=0<br>K=0 | Y=155<br>M=221<br>C=0<br>K=0 | Y=0<br>M=0<br>C=209<br>K=0 | Y=0<br>M=0<br>C=255<br>K=0 |
| Y=200<br>M=255<br>C=0<br>K=0 | Y=200<br>M=255<br>C=0<br>K=0 | Y=155<br>M=221<br>C=0<br>K=0 | Y=0<br>M=0<br>C=209<br>K=0 | Y=0<br>M=0<br>C=255<br>K=0 |
| Y=200<br>M=255<br>C=0<br>K=0 | Y=200<br>M=255<br>C=0<br>K=0 | Y=155<br>M=221<br>C=0<br>K=0 | Y=0<br>M=0<br>C=209<br>K=0 | Y=0<br>M=0<br>C=255<br>K=0 |

F I G. 13B

| Y=200<br>M=255<br>C=0<br>K=0 | Y=200<br>M=255<br>C=0<br>K=0 | Y=155<br>M=221<br>C=209<br>K=0 | Y=0<br>M=0<br>C=255<br>K=0 | Y=0<br>M=0<br>C=255<br>K=0 |
|---|---|---|---|---|
| Y=200<br>M=255<br>C=0<br>K=0 | Y=200<br>M=255<br>C=0<br>K=0 | Y=155<br>M=221<br>C=209<br>K=0 | Y=0<br>M=0<br>C=255<br>K=0 | Y=0<br>M=0<br>C=255<br>K=0 |
| Y=200<br>M=255<br>C=0<br>K=0 | Y=200<br>M=255<br>C=0<br>K=0 | Y=155<br>M=221<br>C=209<br>K=0 | Y=0<br>M=0<br>C=255<br>K=0 | Y=0<br>M=0<br>C=255<br>K=0 |
| Y=200<br>M=255<br>C=0<br>K=0 | Y=200<br>M=255<br>C=0<br>K=0 | Y=155<br>M=221<br>C=209<br>K=0 | Y=0<br>M=0<br>C=255<br>K=0 | Y=0<br>M=0<br>C=255<br>K=0 |
| Y=200<br>M=255<br>C=0<br>K=0 | Y=200<br>M=255<br>C=0<br>K=0 | Y=155<br>M=221<br>C=209<br>K=0 | Y=0<br>M=0<br>C=255<br>K=0 | Y=0<br>M=0<br>C=255<br>K=0 |

IMAGE FORMING APPARATUS CONFIGURED TO PERFORM GRADATION CORRECTION PROCESS

BACKGROUND OF THE INVENTION

Field of the Invention

The present invention relates to a technique for suppressing image defects due to color misregistration in an image forming apparatus.

Description of the Related Art

Color misregistration may occur in an image forming apparatus configured to form a full color image by overlaying images of a plurality of different colors. Therefore, US-2002-054200 discloses a configuration in which a pattern for detecting a color misregistration amount is formed over an intermediate transfer belt, so as to reduce color misregistration based on the detection result of the pattern. In addition, occurrence of color misregistration in adjacent areas of two colors for which a common color toner is not used may result in white gaps. Since the human eye is sensitive to white gaps, white gaps degrade the quality of images formed. Japanese Patent No. 5335221 discloses a configuration that performs a trapping process to suppress white gaps.

Occurrence of color misregistration may result in an unintended overlapping area of toner, thereby increasing the amount of toner in the area. The unintended increase of the amount of toner may cause image defects. Specifically, increase of the amount of toner may result in toner scattering in the transfer portion, increased transfer residual toner, hot offset at the fixing portion, or the like.

SUMMARY OF THE INVENTION

According to an aspect of the present invention, an image forming apparatus includes: a gradation correction unit configured to: perform a first gradation correction process on first image data expressing first gradation values respectively of a plurality of colors of respective pixels of an image, and output second image data expressing second gradation values respectively of the plurality of colors of the respective pixels of the image, the gradation correction unit being configured to determine the second gradation values respectively of the plurality of colors of a first process target pixel of the image, based on the first gradation values respectively of the plurality of colors of a plurality of first pixels in a first area including the first process target pixel and having a size corresponding to a first color misregistration amount; and an image forming unit configured to form a toner image on a sheet based on the second image data, wherein the gradation correction unit is further configured to determine the second gradation values respectively of the plurality of colors of the respective pixels such that there is no pixel in which a sum of the second gradation values of the plurality of colors exceeds a first threshold value, even when color misregistration within the first color misregistration amount occurs in the toner image formed on the sheet by the image forming unit.

Further features of the present invention will become apparent from the following description of exemplary embodiments with reference to the attached drawings.

BRIEF DESCRIPTION OF THE DRAWINGS

FIGS. 6A and 6B illustrate gradation values of pixels before and after the gradation correction process according to one embodiment.

FIGS. 7A and 7B illustrate gradation values of respective colors of respective pixels of an image formed in a case where color misregistration has occurred.

FIG. 9 illustrates gradation values of pixels after the gradation correction process according to one embodiment.

FIGS. 10A and 10B illustrate gradation values of respective colors of respective pixels of an image formed in a case where color misregistration has occurred.

FIG. 11 illustrates gradation values of respective colors of respective pixels of an image formed in a case where color misregistration has occurred.

FIGS. 12A and 12B illustrate gradation values of respective colors of respective pixels of an image formed in a case where color misregistration has occurred.

FIGS. 13A and 13B illustrate gradation values of respective colors of respective pixels of an image formed in a case where color misregistration has occurred.

DESCRIPTION OF THE EMBODIMENTS

Figure 1:
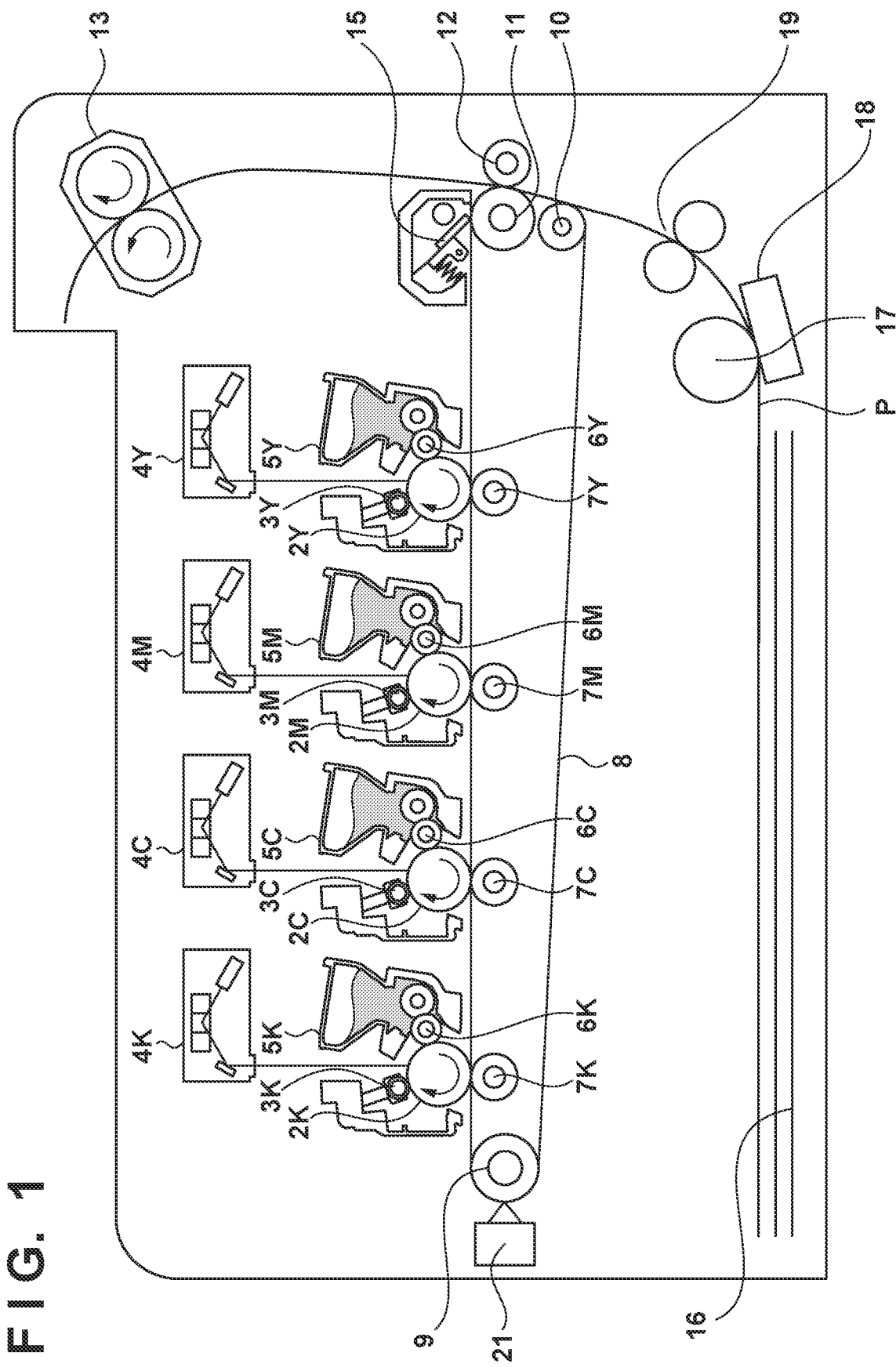
FIG. 1 is a configuration diagram of an image forming apparatus according to one embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a configuration diagram of an image forming apparatus according to the present embodiment. In a case where a reference numeral refers to a member in the drawings described below, the characters Y, M, C and K at the end of the reference numeral indicate that the colors of the toner, which the member is involved in formation, are yellow, magenta, cyan, and black, respectively. Additionally, in a case where a reference numeral refers to a toner image, characters Y, M, C and K at the end of the reference numeral indicate that the colors of the toner image are yellow, magenta, cyan, and black, respectively. However, in a case where it is not necessary to distinguish the colors, the characters at the end of the reference numeral are omitted. A photoconductor 2 is rotationally driven in a clockwise direction in the drawing when forming an image. A charge roller 3 charges the surface of the corresponding photoconductor 2 to a uniform electric potential. An exposing device 4 exposes the surface of the corresponding photoconductor 2 to light to form an electrostatic latent image on the photoconductor 2. A developer 5 uses a developing bias voltage output from a developing roller 6 to develop the electrostatic latent image of the photoconductor 2 with toner, and forms a toner image on the photoconductor 2. A primary transfer roller 7 transfers the toner image of the photoconductor 2 to an intermediate transfer belt 8, by outputting a primary transfer bias voltage. Here, it is possible to form a full-color toner image on the intermediate transfer belt 8 by transferring toner images formed on each photoconductor 2 to the intermediate transfer belt 8 in an overlapping manner.

The intermediate transfer belt 8, being stretched by a drive roller 9, a tension roller 10, and a secondary transfer inner roller 11, is rotationally driven in a counterclockwise direction in the drawing when forming an image. Therefore, the toner image transferred to the intermediate transfer belt 8 is conveyed to an opposing position of a secondary transfer roller 12. On the other hand, the recording material P (sheet) on a tray 16 is fed to the conveyance path one by one by a feed roller 17 and a separation pad 18, and conveyed to the opposing position of the secondary transfer roller 12 by a roller pair 19. The secondary transfer unit 12 transfers the toner image of the intermediate transfer belt 8 to the recording material P by outputting a secondary transfer bias voltage. Here, the toner which has not been transferred to the recording material P and thus remains on the intermediate transfer belt 8 is removed and collected by a cleaning portion 15. The recording material P to which the toner image has been transferred is conveyed to a fixing apparatus 13. The fixing apparatus 13 pressurizes and heats the recording material P to fix the toner image on the recording material P. The recording material P on which the toner image has been fixed is discharged out of the image forming apparatus. A sensor 21 detects the toner image formed on the intermediate transfer belt 8 in a color misregistration correction process described below. Here, in the present embodiment, two sensors 21 are provided at two different positions in a direction perpendicular to the direction of movement of the intermediate transfer belt surface.

Figure 2:
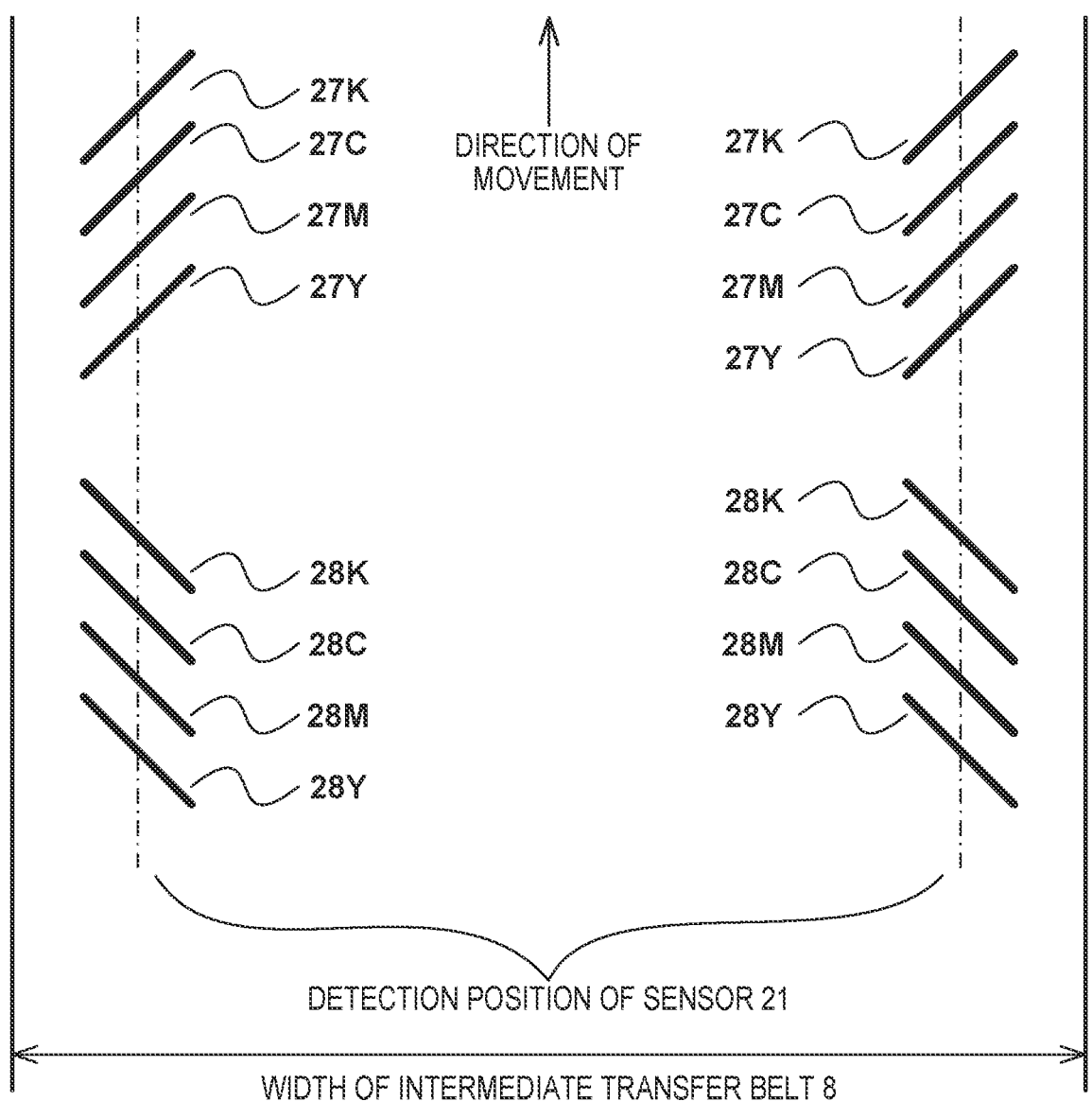
FIG. 2 illustrates a registration pattern according to one embodiment.

The image forming apparatus performs the color misregistration correction process at a predetermined timing. In the color misregistration correction process, the image forming apparatus forms a registration pattern illustrated in FIG. 2 on the intermediate transfer belt 8. Here, the image forming apparatus forms the registration pattern at a position corresponding to each of the sensors 21. The registration pattern has toner images 27Y, 27M, 27C, 27K, 28Y, 28M, 28C and 28K. Here, the toner images 27Y, 27M, 27C and 27K are linear images at a same angle with respect to the direction of movement of the intermediate transfer belt surface, and the toner images 28Y, 28M, 28C, and 28K are linear images at a same angle with respect to the direction of movement of the intermediate transfer belt surface. However, as illustrated in FIG. 2, the toner images 27Y, 27M, 27C, and 27K and the toner images 28Y, 28M, 28C, and 28K are linear symmetric patterns with respect to the direction of movement of the intermediate transfer belt surface. The control unit 23 (FIG. 3) of the image forming apparatus detects the interval between the toner images 27 and 28 of a same color, based on the detection result of the registration pattern by the sensor 21, and determines, by a known method, the relative color misregistration amount of other colors from yellow, for example. The control unit 23 then adjusts the image forming condition, for example, the exposure timing of the exposing device 4, so as to reduce the color misregistration. However, there may occur color misregistration of about a few pixels due to a detection error by the sensor 21, a change in temperature inside the image forming apparatus after the color misregistration correction process, or the like.

Figure 3:
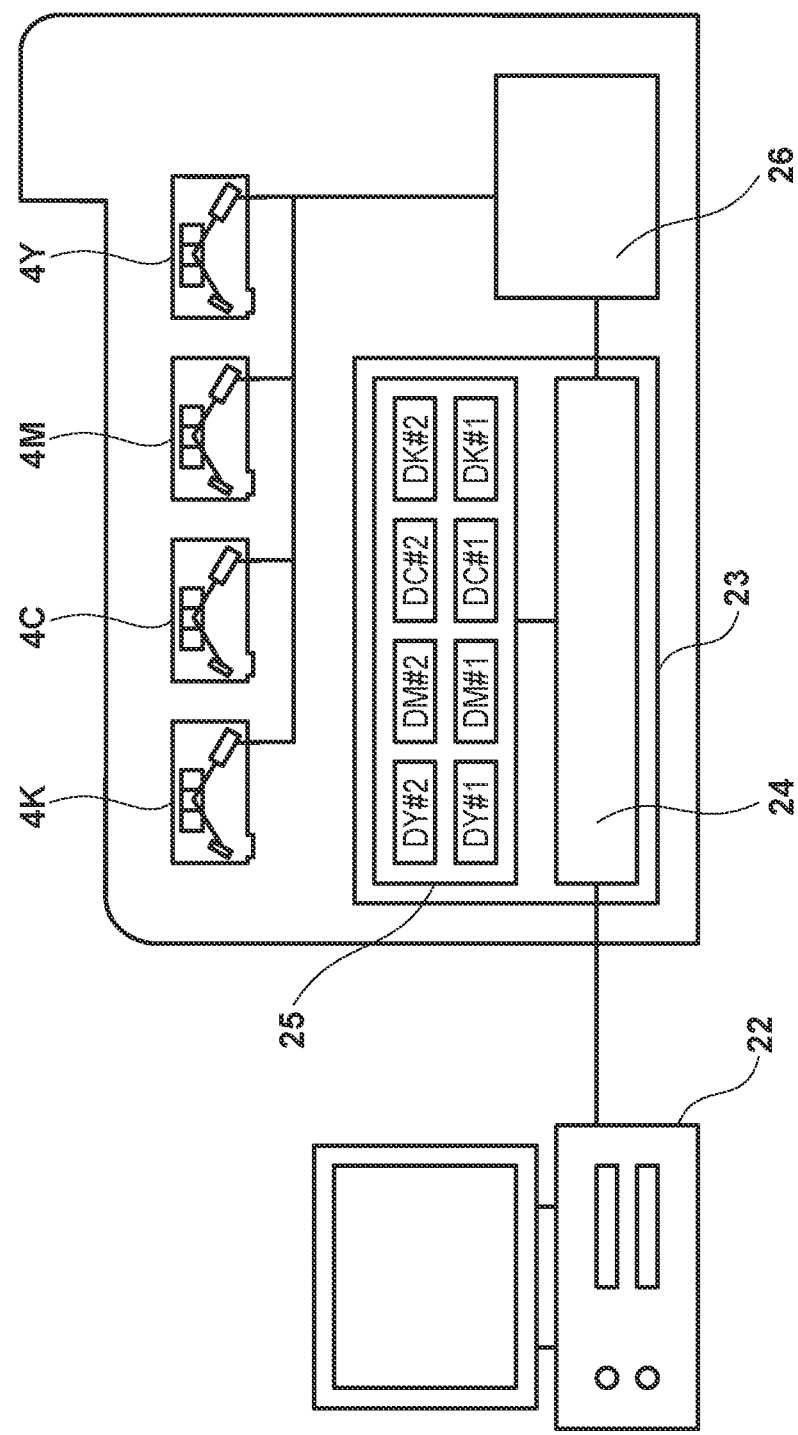
FIG. 3 is a control configuration diagram of an image forming apparatus according to one embodiment.

FIG. 3 is a diagram explaining the flow of the image data processing in the image forming apparatus according to the present embodiment. The image forming apparatus, upon receiving a start instruction of a print job together with image data from the personal computer (PC) 22, starts image formation in accordance with the print job. Here, the image data from PC22 is, for example, RGB data expressing the gradation of red (R), green (G) and blue (B) in eight bits for each pixel. The calculation unit 24 of the control unit 23 converts the RGB data into YMCK data expressing the gradation values respectively of yellow (Y), magenta (M), cyan (C) and black (K) in eight bits. The gradation values DY #1, DM #1, DC #1 and DK #1 of yellow, magenta, cyan and black colors of each pixel expressed by the YMCK data are stored in an image memory 25. The calculation unit 24 performs a "gradation correction process" on the YMCK data. The gradation correction process is performed to suppress image defects even when color misregistration occurs. The gradation values DY #2, DM #2, DC #2 and DK #2 of yellow, magenta, cyan and black colors of each pixel expressed by the YMCK data subjected to the gradation correction process are stored in the image memory 25.

The YMCK data subjected to the gradation correction process is converted into a drive signal for driving the light source of each of the exposing devices 4 by the conversion circuit 26, and output to each of the exposing devices 4. The amount of toner of the image to be formed depends on the gradation values DY #2, DM #2, DC #2 and DK #2. The image forming apparatus repeats the aforementioned process until image formation on all the total recording materials P specified in the print job is completed.

The image forming apparatus of the present embodiment causes the developing roller 6 to collect the toner which has not been transferred to the intermediate transfer belt 8 and thus remains on the photoconductor 2, after having charged the remaining toner by the charging roller 3. However, the toner which has not been collected by the developing roller 6 is transferred to the intermediate transfer belt 8 by the primary transfer bias voltage output from the primary transfer roller 7, and turns into an image defect called "ghost". An examination of conditions for appearance of ghosts based on various images in the image forming apparatus of the present embodiment suggests that visible ghosts appear in a case where the sum of gradation values of Y, M, C, and K is equal to or greater than 650. In addition, the closer to the maximum gradation value (255 in the present example) a gradation value lies, the more visible ghosts become, rather than the case where gradation values of respective colors are uniform. Furthermore, the greater the gradation value of a color transferred at the most downstream of the circulating conveyance direction of the intermediate transfer belt 8, the more easily visible ghosts becomes.

In the following, the gradation correction process in the present embodiment will be described. The gradation correction process of the present embodiment is a process that suppresses the sum of gradation values of respective colors to be equal to or smaller than a predetermined value (first threshold value) for suppressing ghosts even when color misregistration has occurred. In the image forming apparatus according to the present embodiment, as described above, visible ghosts appear when the total gradation value reaches 650 or more, and therefore the first threshold value is set to 585 in the following description. The gradation correction process in the present embodiment is also a filtering process, the size of the filter used being set based on an assumed color misregistration amount (number of pixels). Here, the assumed color misregistration amount, which is an amount of color misregistration that may remain in the aforementioned color misregistration correction process, or an amount of color misregistration that occurs due to a change in temperature after the color misregistration correction process, lies in a range of about a few pixels. Assuming that color misregistration by n pixels occurs, for example, the size of the filter may be a size of 2n+1 pixels in a main-scanning direction and a sub-scanning direction, respectively. Here, the sub-scanning direction corresponds to the circumferential direction of the photoconductor 2, and the main-scanning direction is a direction perpendicular to the sub-scanning direction. In the following description, the assumed color misregistration amount is set to one pixel, and therefore the filtering area has a size of 3×3 pixels. Additionally, in the following description, yellow, magenta, cyan, and black are denoted Y, M, C, and K, respectively.

Figure 4:
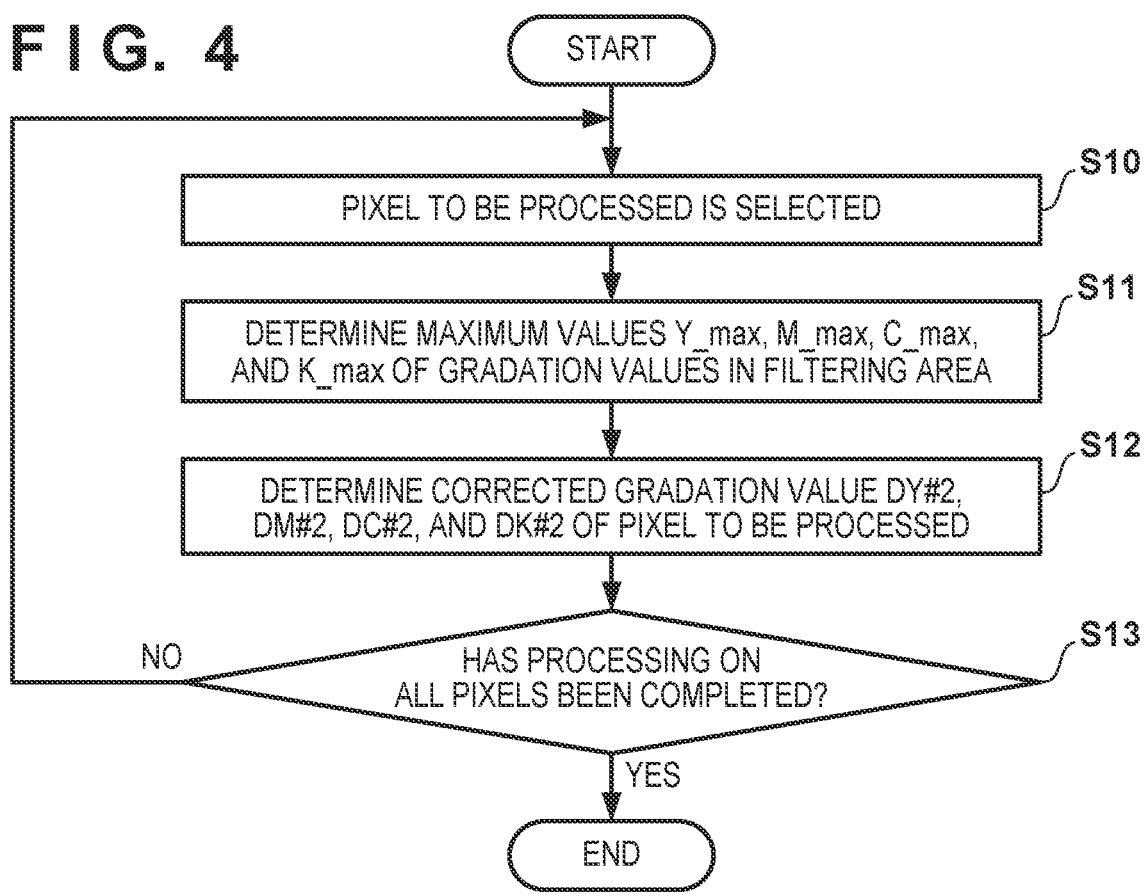
FIG. 4 is a flowchart of a gradation correction process according to one embodiment.

FIG. 4 is a flowchart of the gradation correction process according to the present embodiment. At S10, the calculation unit 24 selects a pixel to be processed. Here, in a case where the pixels of the image are arranged over a two-dimensional plane in the main-scanning direction and the sub-scanning direction, the calculation unit 24 first selects the top-left pixel as a pixel to be processed and performs the process. Subsequently, the calculation unit 24 sequentially selects the right-next pixel along the main-scanning direction as a pixel to be processed and performs the process. The calculation unit 24, after having selected and processed the last pixel (the right-most pixel) in the main-scanning direction, subsequently selects, as pixels to be processed, the pixels arranged one row below the firstly processed pixels. The calculation unit 24 subsequently selects and processes pixels in a similar manner and, after having selected and processed the bottom-right pixel, terminates the gradation correction process.

The calculation unit 24 determines, at S11 for each of the colors Y, M, C, and K, maximum values Y_max, M_max, C_max, and K_max of the gradation values of nine pixels in the filtering area centered on the pixel to be processed. FIG. 6A illustrates an example of the gradation values DY #1, DM #1, DC #1, and DK #1 before performing the gradation correction process. Here, the pixel at the center of FIG. 6A is a pixel to be processed, with 9 pixels centered on the pixel to be processed being pixels included in the filtering area. In the case of FIG. 6A, the maximum values Y_max, M_max, C_max, and K_max are 200, 255, 255, and 0, respectively. Here, the filtering area includes an area outside an image in a case where a pixel to be processed turns out to be the right-most, the left-most, the top-most, or the bottom-most pixel in the image, in which case the maximum value of respective colors is determined assuming that respective gradation values of Y, M, C, and K are 0 in the area outside the image.

The calculation unit 24 determines the gradation values DY #2, DM #2, DC #2, and DK #2 of respective colors subjected to the gradation correction process, based on the maximum values Y_max, M_max, C_max, and K_max calculated at S11. Details of the processing at S12 will be described below. The calculation unit 24 determines at S13 whether or not the processing on all the pixels has been completed, and when not, repeats the processing from S10. When, on the other hand, processing on all the pixels has been completed, the calculation unit 24 terminates the process of FIG. 4.

Figure 5:
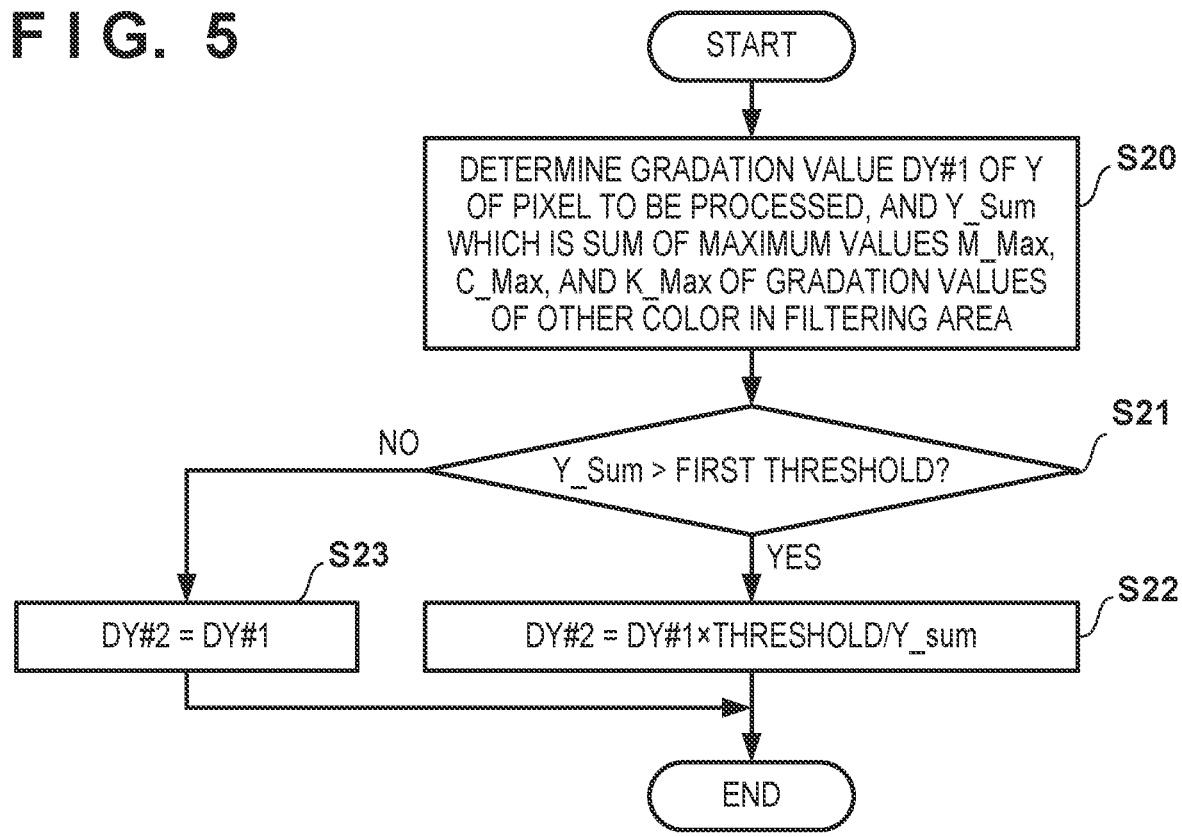
FIG. 5 is a flowchart illustrating a processing at S12 of FIG. 4.

FIG. 5 is a flowchart of a process for determining, at S12 of FIG. 4, a corrected gradation value DY #2 of a pixel to be processed. Here, the calculation unit 24 also determines corrected gradation values DM #2, DC #2, and DK #2 of M, C, and K colors of the pixel to be processed, respectively, which is similar to the process of FIG. 5 and therefore description of the processing of M, C, and K is omitted.

First, at S20, the calculation unit 24 calculates, as Y_Sum, the sum of M_max, C_max, and K_max calculated at S11, for the gradation value DY #1 of Y which is the target color of the pixel to be processed, and M, C, and K which are not target colors. For example, in FIG. 6A, DY #2 of the pixel to be processed is 200, with M_max, C_max and K_max being 255, 255 and 0, respectively, and therefore Y_Sum turns out to be 710. The calculation unit 24 determines at S21 whether or not Y_Sum is greater than the first threshold value. When Y_Sum is equal to or smaller than the first threshold, the calculation unit 24 sets DY #2 to be equal to DY #1 at S23. In other words, the gradation value is not changed. When, on the other hand, the Y_Sum is greater than the first threshold, the calculation unit 24 determines DY #1×threshold/Y_Sum to be DY #2. In FIG. 6A, Y_Sum is 710, and is greater than the threshold 585, which gives DY #2=200×585/710=165. FIG. 6B illustrates the corrected gradation values DY #2, DM #2, DC #2, and DK #2 of the pixel parts of FIG. 6A.

The gradation correction process illustrated in FIG. 4 and FIG. 5 suppresses the sum of gradation values of respective colors for respective pixels to be equal to or smaller than the first threshold value, even when color misregistration within an expected color misregistration amount occurs. For example, FIGS. 7A and 7B illustrate a state in which the cyan toner image is shifted leftward by one pixel in the pixel parts illustrated in FIGS. 6A and 6B. Here, FIG. 7A illustrates a case where the aforementioned gradation correction process has not been performed, and FIG. 7B illustrates a case where the gradation correction process has been performed. In FIG. 7A, the sum of gradation values of respective pixels along the central column is 710, exceeding the first threshold value. In FIG. 7B, on the other hand, the sum of gradation values is at most 585 (pixels along the central column), which does not exceed the first threshold value.

Here, in the present embodiment, the size of the filtering area is assumed to be the same in the main-scanning direction and the sub-scanning direction. However, for example, in a case where different color misregistration amounts are assumed in the main-scanning direction and the sub-scanning direction, different sizes of the filtering area may be set in the main-scanning direction and the sub-scanning direction. In other words, the shape of the filtering area is not limited to be square and may be rectangular. Furthermore, in a case where color misregistration is independent in the main-scanning direction and the sub-scanning direction, and follows Gaussian distribution, it is also possible to set a circular area centered on the pixel to be processed as the filtering area.

In addition, at S20 of FIG. 5, the gradation value of the target color of the pixel to be processed is added to the maximum value of the gradation values of the other three colors in the filtering areas. However, for example, there may also be a configuration in which the sums of maximum values of respective colors calculated at S11 of FIG. 4 are taken as Y_Sum, M_Sum, C_Sum, and K_Sum in the process of FIG. 5. In this case, Y_Sum, M_Sum, C_Sum, and K_Sum are of a same value, simplifying the process of FIG. 5. For example, image data of a business document including characters and clip art has little abrupt density change except for the boundary with the blank portion of the image, and therefore such simplification has little effect.

Here, although the sum of gradation values of respective colors has set to be equal to or smaller than the first threshold value in the present embodiment in order to suppress appearance of ghosts, image defects to be reduced are not limited to ghosts. For example, the present invention is also applicable to a case of setting the sum of gradation values of respective colors to be equal to or smaller than a predetermined threshold in order to suppress scattering of toner when transferring a toner image to a sheet, increase of transfer residual toner, hot offset at the fixing portion, or the like.

Second Embodiment

Figure 8:
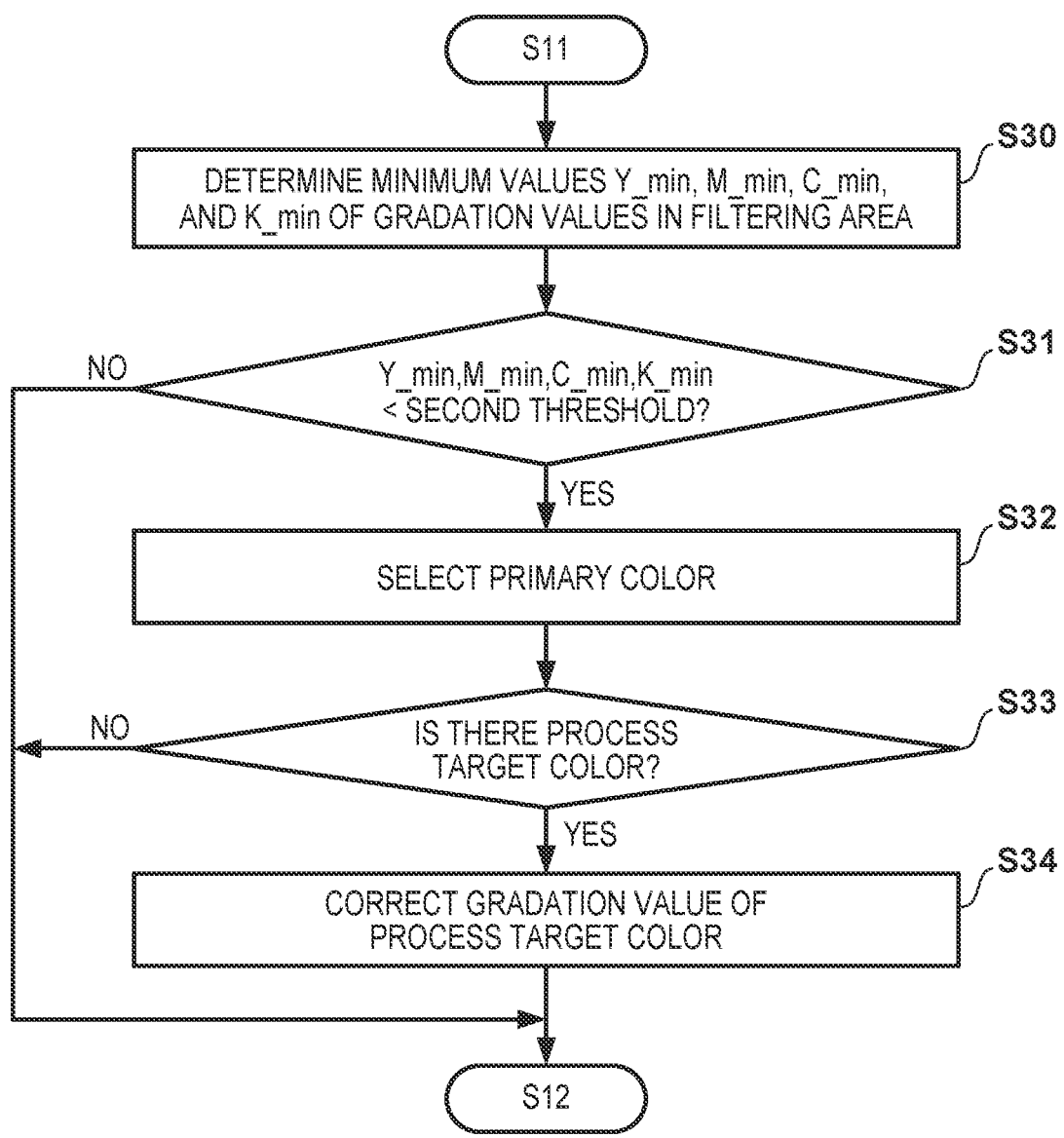
FIG. 8 is a flowchart of the gradation correction process according to one embodiment.

The following describes a second embodiment mainly about differences from the first embodiment. In the present embodiment, a trapping process is performed in the gradation correction process, in addition to the process of suppressing the sum of gradation values of respective colors of pixels (total amount regulation process, in the following), in order to suppress occurrence of white gaps due to color misregistration. The gradation correction process of the present embodiment performs, subsequent to S11 in the flowchart of FIG. 4, the trapping process indicated by S30 to S34 of FIG. 8 is performed. Then, the processes at and after S12 in FIG. 4 are performed. In the following, FIG. 8 will be described. In the following, the trapping coefficient Tr is set to 0.25. In addition, the upper limit (second threshold value) used in image formation to determine that respective colors of Y, M, C, and K are at a white level is set to 32.

The calculation unit 24 determines, at S30 for each of the colors Y, M, C and K, minimum values Y_min, M_min, C_min, and K_min of the gradation values of nine pixels in the filtering area centered on the pixel to be processed. In the case of FIG. 6A, the minimum values Y_min, M_min, C_min, and K_min all turn out to be 0. The calculation unit 24 determines at S31 whether or not the minimum values Y_min, M_min, C_min, and K_min are all smaller than the second threshold value. When any of the minimum values Y_min, M_min, C_min, and K_min are equal to or greater than the second threshold value, the calculation unit 24 advances the process flow to S12 without performing the trapping process. When, on the other hand, the minimum values Y_min, M_min, C_min, and K_min are all smaller than the second threshold value, the calculation unit 24 selects a primary color (reference color) at S32. The primary color is a color having the highest degree of brightness reduction among the four colors in the pixel to be processed. Here, the degree of brightness reduction is a value indicating a degree of reduction of brightness of a toner image formed with a first gradation value of the pixel to be processed from the brightness of the sheet. In the present embodiment, the difference between the brightness (L*) of the sheet and the brightness (L*) at the maximum gradation value (upper limit of gradation values: 255 in the present example) multiplied by a ratio of a gradation value relative to the maximum gradation value is used as an evaluation value for the degree of brightness reduction. For example, the brightness of the maximum gradation values of Y, M, C and K is set to 94, 52, 56, and 24, and the brightness of the sheet is set to 98. In this case, the degree of brightness reduction of yellow color of the pixel to be processed in FIG. 6A turns out to be 200/255×(98−94)=3.1. In addition, the degree of brightness reduction of magenta color of the pixel to be processed in FIG. 6A turns out to be 255/255×(98−52)=46. Furthermore, the gradation values of cyan and black colors of the pixel to be processed in FIG. 6A are both 0, and therefore the degree of brightness reduction is 0. Therefore, magenta is selected as the primary color in the pixel to be processed in FIG. 6A.

Here, when there are a plurality of colors with the highest degree of brightness reduction, the color with the lowest brightness at the maximum gradation value is selected as the primary color.

Subsequently, the calculation unit 24 determines, at S33 in accordance with a selection criterion of the trapping target, whether or not there exists a color satisfying the selection criterion. Specifically, the calculation unit 24 first determines whether or not there exists a color satisfying a first selection criterion. The first selection criterion is such that the brightness at the maximum gradation value (or at a same gradation value) is higher than the primary color, and that the gradation value is smaller than the second threshold value. If there are a plurality of colors satisfying the first selection criterion, the calculation unit 24 further applies a second selection criterion to narrow down the colors to be selected. The second selection criterion is the color having the largest degree of the brightness reduction at the maximum values Y_max, M_max, C_max and K_max calculated at S11 of FIG. 4. In a case where there are a plurality of colors satisfying the second selection criterion, the calculation unit 24 further applies a third selection criterion to narrow down the colors to be selected to one color. The third selection criterion is the color having the lowest brightness at the maximum gradation value. In the present example, the primary color is magenta, and the colors whose brightness at the maximum gradation value is higher than magenta are yellow and cyan. Here, as illustrated in FIG. 6A, the gradation value of yellow color of the pixel to be processed is 200, which is greater than the second threshold value. On the other hand, the gradation value of cyan color of the pixel to be processed is 0, which is smaller than the second threshold value. Therefore, only cyan is the color satisfying the first selection criterion, whereby cyan is selected as the process target color of the trapping process in the present example. When there is no color satisfying the first selection criterion, the calculation unit 24 advances the process flow to S12. When, on the other hand, there exists a color satisfying the first selection criterion, the calculation unit 24 applies the second selection criterion or the third selection criterion as necessary to select a process target color of the trapping process, and corrects the gradation value of the process target color at S34.

Specifically, the calculation unit 24 calculates, for the process target color, a trapping value as a result of multiplying the maximum value C_max calculated at S11 of FIG. 4 by a trapping coefficient Tr. When the trapping value is greater than the gradation value of the process target color of the pixel to be processed, the trapping value is taken as the gradation value after correction of the process target color of the pixel to be processed. When, on the other hand, the trapping value is equal to or smaller than the gradation value of the process target color of the pixel to be processed, the gradation value after correction of the process target color is set to be the same as before the correction. In the present example, the maximum value C_max is 255 and the trapping coefficient Tr is 0.25, and therefore the trapping value turns out to be 64. The gradation value of the process target color (cyan) of the pixel to be processed is 0, the gradation value of the process target color (cyan) of the pixel to be processed turns out to be 64. The calculation unit 24 subsequently performs the processes at and after S12 based on the corrected gradation value.

FIG. 9 illustrates gradation values after performing the gradation correction process according to the present embodiment on the pixel parts illustrated in FIG. 6A. In addition, FIG. 10A illustrates a state in which cyan is shifted leftward by one pixel when forming an image with the gradation values of FIG. 9, and FIG. 10B illustrates a state in which cyan is shifted rightward by one pixel. In all the pixels, none of the colors has a zero-gradation value, and there is no occurrence of white gaps. Furthermore, in both FIGS. 10A and 10B, sums of gradation values of respective colors of all the pixels do not exceed the first threshold 585. On the other hand, FIG. 11 illustrates a state in which cyan is shifted rightward by one pixel when the image is formed with the gradation value of FIG. 6A without performing the gradation correction process according to the present embodiment. As is apparent from FIG. 11, despite that there is essentially no pixel in which all the colors have gradation values equal to or smaller than the second threshold value, all the colors of the pixels along the second right-most column have gradation values equal to or smaller than the second threshold value due to color misregistration. In other words, there is occurrence of white gaps.

Here, in the present embodiment, the maximum gradation values Y_max, M_max, C_max, and K_max are determined at S11. Therefore, increasing the gradation value of the process target color subsequently at S34 may result in that the actual gradation value of the process target color turns out to be different from the maximum gradation value calculated at S11. Therefore, performing the process of FIG. 5 using the maximum gradation values Y_max, M_max, C_max, and K_max calculated at S11 may result in that the sum of gradation values of respective colors is greater than 585, which is the first threshold, in the image data corrected by the process of FIG. 5. Stating in more detail, the maximum value of the trapping value in the trapping process of the present embodiment is 64 and therefore the sum of gradation values of respective colors may be 649, i.e., the result of adding 64 to the first threshold value 585, in the image data corrected by the processing of FIG. 5. Also in this case, however, the sum of gradation values is equal to or smaller than the lower limit value (minimum value) 650 that allows for appearance of ghosts, whereby it is possible to suppress appearance of ghosts. In contrast, the first threshold value is set to be equal to or smaller than a value calculated by subtracting the maximum value 64 of the trapping value from the upper limit (third threshold, namely 649 in the present example) of the sum of gradation values of one pixel, the upper limit being acceptable to prevent generation of image defects. Here, the maximum value of the trapping is set to be equal to or greater than the second threshold value and smaller than the upper limit (255) of the gradation values, for example. In other words, the second coefficient is a value equal to or greater than a value calculated by dividing the second threshold value by the upper limit of the gradation values, and also a value smaller than 1.

Here, in the present embodiment, although the total amount regulation processes (FIGS. 4 and 5) and the trapping process are collectively performed in the gradation correction process, the processes may be separately performed. Specifically, the calculation unit 24 first performs the trapping process on the gradation values DY #1, DM #1, DC #1 and DK #1 of respective colors expressed by the image data, and generates image data subjected to the trapping process. Here, the gradation values of respective colors expressed by the image data subjected to the trapping process are, for example, gradation values DY #3, DM #3, DC #3 and DK #3. Subsequently, the calculation unit 24 performs the total amount regulation processes illustrated in FIGS. 4 and 5 on the gradation values DY #3, DM #3, DC #3 and DK #3 expressed by the image data subjected to the trapping process, and outputs image data expressing the gradation values DY #2, DM #2, DC #2 and DK #2. Here, the gradation values DY #1, DM #1, DC #1 and DK #1 in FIGS. 4 and 5 are replaced in this case by the gradation values DY #3, DM #3, DC #3, and DK #3. In this case, the sum of gradation values of respective colors of each pixel subjected the gradation correction process turns out to be constantly equal to or smaller than the first threshold value. Here, in this case, the filter sizes in the trapping process and the total amount regulation process may be different, that is, for example, the size of the filter in the total amount regulation process may be equal to or greater that the filter size in the trapping process. Here, increasing the size of the filter in the total amount regulation process to be greater than the filter size in the trapping process allows for reducing the impact of correction of the process target color of the trapping process on the total amount regulation process.

Here, in the present embodiment, one color has been selected as the process target color of the trapping process. However, all the colors satisfying the first selection criterion may be selected as targets of trapping. In addition, there may also be a configuration in which only the trapping process is performed. It is also possible in this case to suppress occurrence of image defects. i.e., white gaps due to color misregistration.

Third Embodiment

The following describes a third embodiment mainly about differences from the first embodiment. In a first embodiment, the process of FIG. 5 is uniformly applied to respective colors. This is intended to reduce variation of color tone in the image. However, the closer to the maximum gradation value a gradation value lies, the more likely ghosts appear. In the present embodiment, therefore, the closer to the maximum gradation value a gradation value lies, the more significantly the gradation value decreases.

In the present embodiment, therefore, gradation values equal to or greater than a predetermined value are corrected to the predetermined value in a preprocessing before performing the processes of FIGS. 4 and 5, and subsequently the processes of FIGS. 4 and 5 are performed based on the corrected gradation values. Here, gradation values smaller than the predetermined value are not corrected. In the present embodiment, the predetermined value is set to 235. For example, in the processing of yellow color of the pixel to be processed in FIG. 6A, Y_sum to be calculated at S20 is actually 200+255+255+0=710. In the present embodiment, however, it turns out that Y_sum=200+235+235+ 0=670. Therefore, DY #2 turns out to be 200×585/670=175 at S22. FIG. 12A illustrates the corrected gradation values DY #2, DM #2, DC #2 and DK #2 of the pixel parts of FIG. 6A. FIG. 12B illustrates a state in which cyan is shifted leftward by one pixel when forming an image with the gradation of FIG. 12A. In comparison with the first embodiment, the corrected gradation value of magenta color of the pixel to be processed has been significantly reduced from 255 to 205. On the other hand, for the gradation value of yellow having a smaller gradation value than the magenta, the amount of reduction turns out to be smaller than in the first embodiment, namely, from 200 to 175. In addition, for all the pixels, the sum of gradation values turns out to be equal to or smaller than 585, which is the first threshold value.

As has been described above, setting a larger amount of reduction of the gradation value for a greater gradation value allows for reducing occurrence of image defects. For example, although presence of a color with a large gradation value when reducing the primary transfer bias voltage may facilitate occurrence of ghosts, the gradation correction process according to the present embodiment allows for reducing occurrence of image defects in such a case.

Fourth Embodiment

The following describes a fourth embodiment mainly about differences from the first embodiment. In the present embodiment, the gradation correction process is performed taking into account sensitivity of the human eye to color difference. Among the four colors in the present embodiment, sensitivity of the human eye to color difference lies in ascending order along yellow, cyan, magenta and black. In other words, the color difference of yellow is most difficult, and the color difference of black is easiest, to be perceived by the human eye. In other words, the higher the brightness at a same gradation value is, the more difficult it becomes for the human eye to recognize the color difference. In the present embodiment, therefore, the preprocessing performed before the processes of FIGS. 4 and 5 performs correction that reduces the gradation value more significantly for a color with a higher brightness. Subsequently, the processes of FIGS. 4 and 5 are performed based on the corrected gradation value. In the present embodiment, correction is performed by multiplying the gradation values of yellow, cyan, magenta and black by the coefficients of, 0.85, 0.9, 0.95 and 1, respectively.

For example, in the processing of yellow color of the pixel to be processed in FIG. 6A, Y_sum to be calculated at S20 is actually 200+255+255+0=710. In the present embodiment, however, it turns out that Y_sum=200×0.85+255×0.95+255×0.9+0×1=642. In addition, DY #2 turns out to be 200×0.85×585/642=155 at S22. FIG. 13A illustrates the corrected gradation values DY #2, DM #2, DC #2 and DK #2 of the pixel parts of FIG. 6A. FIG. 13B illustrates a state in which cyan is shifted by one pixel in the left direction when forming an image with the gradations of FIG. 13A. In comparison with the first embodiment, the gradation value of yellow whose color difference is difficult to visually perceive exhibits a larger degree of reduction in the pixel to be processed than the first embodiment, namely from 200 to 155. Here, the corrected gradation value of the magenta whose gradation value had been the maximum value has now turned out to be 221, exhibiting a smaller amount of reduction than the first embodiment. In addition, for all the pixels, the sum of gradation values turns out to be equal to or smaller than 585, which is the first threshold.

As has been described above, increasing the amount of reduction of the gradation value allows for making color change due to the gradation correction process difficult to be perceived by the human eye, while suppressing occurrence of image defects.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-088576, filed on May 8, 2019, which is hereby incorporated by reference herein in its entirety.

What is claimed is:

1. An image forming apparatus comprising:
a gradation correction unit configured to:
perform a first gradation correction process on first image data expressing first gradation values respectively of a plurality of colors of respective pixels of an image, and
output second image data expressing second gradation values respectively of the plurality of colors of the respective pixels of the image,
the gradation correction unit being configured to determine the second gradation values respectively of the plurality of colors of a first process target pixel of the image, based on the first gradation values respectively of the plurality of colors of a plurality of first pixels in a first area including the first process target pixel and having a size corresponding to a first color misregistration amount; and
an image forming unit configured to form a toner image on a sheet based on the second image data, wherein
the gradation correction unit is further configured to determine the second gradation values respectively of the plurality of colors of the respective pixels such that there is no pixel in which a sum of the second gradation values of the plurality of colors exceeds a first threshold value, even when color misregistration within the first color misregistration amount occurs in the toner image formed on the sheet by the image forming unit.

2. The image forming apparatus according to claim 1, wherein the gradation correction unit is further configured to calculate the second gradation value by reducing the first gradation values of at least one color of the plurality of colors of the pixel, when there is a pixel in which a sum of the first gradation values of the plurality of colors exceeds the first threshold due to occurrence of color misregistration within the first color misregistration amount in the toner image formed on the sheet by the image forming unit.

3. The image forming apparatus according to claim 1, wherein the gradation correction unit is further configured to:
   determine, respectively for the plurality of colors, maximum values of the first gradation values of the plurality of first pixels,
   calculate a sum of the first gradation value of a first color of the plurality of colors of the first process target pixel and the maximum value of a second color which is different from the first color of the plurality of colors and,
   when the sum is greater than the first threshold value, calculate the second gradation value of the first color of the first process target pixel by reducing the first gradation value of the first color of the first process target pixel based on the sum and the first threshold value.

4. The image forming apparatus according to claim 3, wherein the gradation correction unit is further configured to calculate the second gradation value of the first color of the first process target pixel by multiplying the first gradation value of the first color of the first process target pixel by a ratio of the first threshold value relative to the sum, when the sum is greater than the first threshold value.

5. The image forming apparatus according to claim 3, wherein the gradation correction unit is further configured to set the second gradation value of the first color of the first process target pixel to be equal to the first gradation value of the first color of the first process target pixel, when the sum is equal to or smaller than the first threshold value.

6. The image forming apparatus according to claim 1, wherein the gradation correction unit is further configured to:
   determine, respectively for the plurality of colors, maximum values of the first gradation values of the plurality of first pixels, calculate a sum of the maximum values of the plurality of colors and,
   when the sum is greater than the first threshold value, calculate the second gradation values respectively of the plurality of colors of the first process target pixel by reducing the first gradation values respectively of the plurality of colors of the first process target pixel based on the sum and the first threshold value.

7. The image forming apparatus according to claim 6, wherein the gradation correction unit is further configured to calculate the second gradation values respectively of the plurality of colors of the first process target pixel by multiplying the first gradation values respectively of the plurality of colors of the first process target pixel by a ratio of the first threshold value relative to the sum, when the sum is greater than the first threshold value.

8. The image forming apparatus according to claim 6, wherein the gradation correction unit is further configured to set the second gradation values respectively of the plurality of colors of the first process target pixel to be equal to the first gradation values respectively of the plurality of colors of the first process target pixel, when the sum is equal to or smaller than the first threshold value.

9. The image forming apparatus according to claim 2, wherein the gradation correction unit is further configured such that the greater the first gradation value is, the greater the reduction amount is set, when reducing the first gradation value to calculate the second gradation value.

10. The image forming apparatus according to claim 1, wherein the gradation correction unit is further configured to perform the first gradation correction process after having corrected the first gradation value, which had been equal to or greater than a predetermined value of the first image data, to the predetermined value.

11. The image forming apparatus according to claim 2, wherein the gradation correction unit is further configured such that the higher the brightness of a color with a same gradation value among the plurality of colors is, the greater the reduction amount is set, when reducing the first gradation value to calculate the second gradation value.

12. The image forming apparatus according to claim 1, wherein the gradation correction unit is further configured to perform the first gradation correction process after having corrected the first gradation values by multiplying, by a first coefficient corresponding to each of the plurality of colors, the first gradation values respectively of the plurality of colors expressed by the first image data, and the higher the brightness of a color with a same gradation value among the plurality of colors is, the smaller the value taken by the first coefficient becomes.

13. The image forming apparatus according to claim 1, wherein
   the gradation correction unit is further configured to perform a second gradation correction process on third image data expressing a third gradation values respectively of the plurality of colors of the respective pixels of the image to generate the first image data expressing the first gradation values respectively of the plurality of colors of each of the plurality of pixels of the image; and
   the gradation correction unit is further configured to calculate the first gradation values for pixels in which the third gradation value of at least one color of the plurality of colors is equal to or greater than a second threshold value such that all the first gradation values of the plurality of colors do not become smaller than the second threshold value due to occurrence of color misregistration within a second color misregistration amount in the toner image formed on the sheet by the image forming unit.

14. The image forming apparatus according to claim 13, wherein the gradation correction unit is further configured to:
   determine minimum values of the third gradation values respectively of the plurality of colors of a plurality of second pixels in a second area including a second process target pixel of the image and having a size corresponding to the second color misregistration amount,
   select a process target color from the plurality of colors according to a predetermined selection criterion, when all the minimum values respectively of the plurality of colors are smaller than the second threshold value, and
   correct the third gradation value of the process target color of the second process target pixel.

15. The image forming apparatus according to claim 14, wherein the size of the first area is equal to or greater than the size of the second area.

16. An image forming apparatus comprising:
   a gradation correction unit configured to:
      perform a gradation correction process on first image data expressing first gradation values respectively of a plurality of colors of respective pixels of an image, and
      output second image data expressing second gradation values respectively of the plurality of colors of the respective pixels of the image, the gradation correction unit being configured to determine the second gradation values respectively of the plurality of colors of a process target pixel of the image, based on the first gradation values respectively of the plurality of colors of a plurality of first pixels in a first area including the process target pixel and having a size corresponding to a first color misregistration amount; and an image forming unit configured to form a toner image on a sheet based on the second image data, wherein the gradation correction unit is further configured to determine the second gradation values respectively of the plurality of colors of the respective pixels such that there is no pixel in which a sum of the second gradation values of the plurality of colors exceeds a third threshold value, even when color misregistration within the first color misregistration amount occurs in the toner image formed on the sheet by the image forming unit and, for pixels in which the first gradation value of at least one color of the plurality of colors is equal to or larger than a second threshold value, all the second gradation values of the plurality of colors do not become smaller than the second threshold value due to occurrence of color misregistration within the first color misregistration amount.

17. The image forming apparatus according to claim 16, wherein the gradation correction unit is further configured to:

determine minimum values of the first gradation values respectively of the plurality of colors of the plurality of first pixels and, when all the minimum values respectively of the plurality of colors are smaller than the second threshold value, select a process target color from the plurality of colors according to a predetermined selection criterion, and correct the first gradation value of the process target color of the process target pixel.

18. The image forming apparatus according to claim 17, wherein the gradation correction unit is further configured to select, for each of the plurality of colors, a reference color based on an evaluation value calculated from the first gradation values of the process target pixel, when all the minimum values respectively of the plurality of colors are smaller than the second threshold value, and the process target color is a color having a higher brightness than the reference color at a same gradation value according to a predetermined selection criterion, and the first gradation value of the process target pixel is smaller than the second threshold value.

19. The image forming apparatus according to claim 18, wherein the evaluation value of each of the plurality of colors is a value indicating a degree of reduction, from the brightness of the sheet, of the brightness of the toner image formed with the first gradation value of the process target pixel.

20. The image forming apparatus according to claim 18, wherein the evaluation values for each of the plurality of colors is a value calculated by multiplying a ratio of the first gradation value of the pixel to be processed relative to an upper limit of the first gradation values by a difference between the brightness of the sheet and the brightness of the toner image formed with the first gradation value, and the gradation correction unit is further configured to select a color having the largest evaluation value as the reference color.

21. The image forming apparatus according to claim 17, wherein the gradation correction unit is further configured to:

determine a maximum value of the first gradation values of the plurality of first pixels for the process target color and, when a value calculated by multiplying the maximum value by a second coefficient is greater than all the first gradation values of the process target color of the process target pixel, set the second gradation value of the process target color of the process target pixel to the value calculated by multiplying the maximum value by the second coefficient.

22. The image forming apparatus according to claim 21, wherein the second coefficient is equal to or greater than a value calculated by dividing the second threshold value by an upper limit of the first gradation values, and is a value smaller than 1.

23. The image forming apparatus according to claim 21, wherein the gradation correction unit is further configured to:

determine, respectively for the plurality of colors, maximum values of the first gradation values of the plurality of first pixels, calculate a sum of the first gradation value of a first color of the plurality of colors of the process target pixel and the maximum value of a second color which is different from the first color of the plurality of colors and, when the sum is greater than a first threshold value, calculate the second gradation value of the first color of the process target pixel by reducing the first gradation value of the first color of the process target pixel based on the sum and the first threshold value, and the first threshold value is smaller than the third threshold value.

24. The image forming apparatus according to claim 21, wherein the gradation correction unit is further configured to:

determine, respectively for the plurality of colors, maximum values of the first gradation values of the plurality of first pixels, calculate a sum of the maximum values of the plurality of colors and, when the sum is greater than a first threshold value, calculate the second gradation values respectively of the plurality of colors of the process target pixel by reducing the first gradation values respectively of the plurality of colors of the process target pixel based on the sum and the first threshold value, and the first threshold value is smaller than the third threshold value.

25. The image forming apparatus according to claim 23, wherein the first threshold value is equal to or smaller than a value calculated by subtracting, from the third threshold value, a value calculated by multiplying the upper limit of the first gradation values by the second coefficient.

26. An image forming apparatus comprising:
a gradation correction unit configured to:
perform a gradation correction process on first image data expressing first gradation values respectively of a plurality of colors of respective pixels of an image, and
output second image data expressing second gradation values respectively of the plurality of colors of the respective pixels of the image, the gradation correction unit being configured to determine the second gradation values respectively of the plurality of colors of a process target pixel of the image, based on the first gradation values respectively of the plurality of colors of a plurality of first pixels in a first area including the process target pixel and having a size corresponding to a first color misregistration amount; and an image forming unit configured to form a toner image on a sheet based on the second image data, wherein the gradation correction unit is further configured to determine the second gradation values such that, for pixels in which the first gradation value of at least one color of the plurality of colors is equal to or greater than a second threshold value, all the second gradation values of the plurality of colors do not become smaller than the second threshold value due to occurrence of color misregistration within the first color misregistration amount in the toner image formed on the sheet by the image forming unit.

\* \* \* \* \*